United States Patent
Choi

(10) Patent No.: US 7,796,246 B2
(45) Date of Patent: Sep. 14, 2010

(54) 3-D SHAPE MEASURING METHOD FOR AUTO-GRINDING EQUIPMENT OF LCD COLOR FILTER AND 3-D SHAPE MEASURING APPARATUS FOR THE SAME

(75) Inventor: Tae-Sun Choi, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 284 days.

(21) Appl. No.: 12/085,761

(22) PCT Filed: Dec. 26, 2006

(86) PCT No.: PCT/KR2006/005709

§ 371 (c)(1),
(2), (4) Date: May 30, 2008

(87) PCT Pub. No.: WO2007/075029

PCT Pub. Date: Jul. 5, 2007

(65) Prior Publication Data

US 2009/0168054 A1    Jul. 2, 2009

(30) Foreign Application Priority Data

Dec. 26, 2005   (KR) .................... 10-2005-0130136
Dec. 26, 2005   (KR) .................... 10-2005-0130137

(51) Int. Cl.
*G01B 9/00* (2006.01)
(52) U.S. Cl. .................. 356/125; 356/601; 356/613; 356/485
(58) Field of Classification Search .......... 356/601–613, 356/125, 485
See application file for complete search history.

(56) References Cited

U.S. PATENT DOCUMENTS

| | | | | |
|---|---|---|---|---|
| 5,608,529 A | * | 3/1997 | Hori | 356/609 |
| 5,668,631 A | * | 9/1997 | Norita et al. | 356/608 |
| 7,019,848 B2 | * | 3/2006 | Mamiya | 356/601 |
| 2004/0046966 A1 | * | 3/2004 | Fujita | 356/604 |
| 2005/0243330 A1 | * | 11/2005 | Magarill et al. | 356/610 |

FOREIGN PATENT DOCUMENTS

JP    2002-221411    8/2002
KR    10-1994-0010358    10/1994

OTHER PUBLICATIONS

Muhammad Bilal Ahmad, Focus Measure Operator using 3D Gradient, Dec. 28-29, 2007, IEEE, pp. 18-22.*

* cited by examiner

*Primary Examiner*—Tarifur R. Chowdhury
*Assistant Examiner*—Isiaka O Akanbi
(74) *Attorney, Agent, or Firm*—Harness, Dickey & Pierce, P.L.C.

(57) ABSTRACT

Provided are a three-dimensional image measuring method and apparatus for an LCD color filter automatic grinder. It is possible to measure a three-dimensional image of an LCD color filter, even though textures for recovering the three-dimensional image are insufficient, by irradiating illumination passed through a patterned filter to the LCD color filter. In addition, it is possible to measure a three-dimensional image of an LCD color filter by obtaining a plurality of image sequences along an optical axis of a camera composed of CCD or CIS. Illumination is irradiated to an LCD color filter to be measured through a patterned filter.

6 Claims, 8 Drawing Sheets

[Fig. 1]
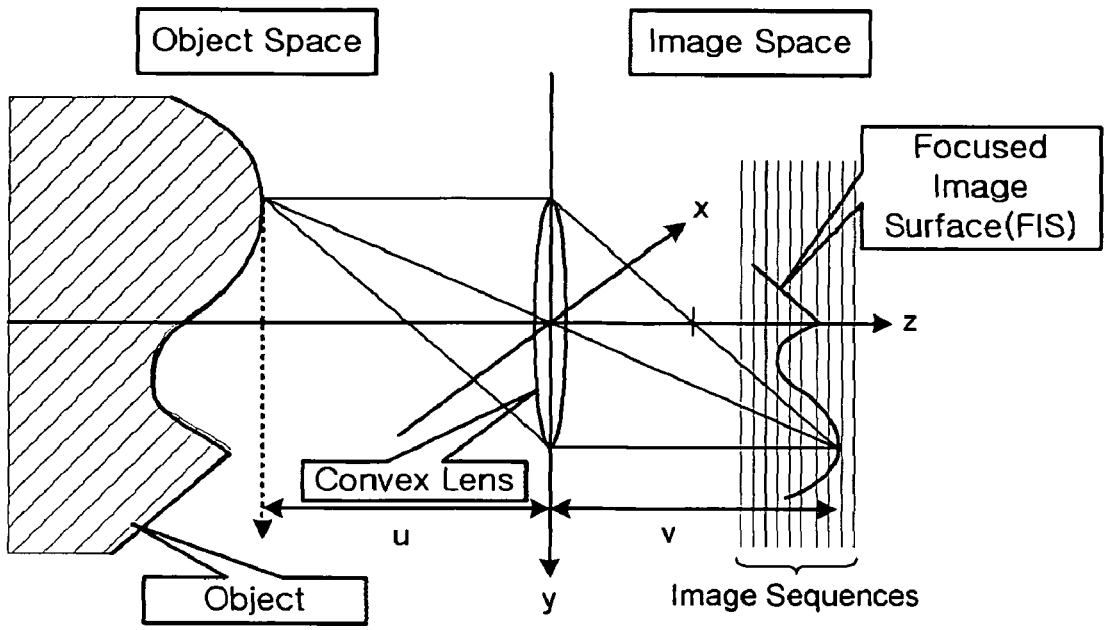
[Fig. 2]
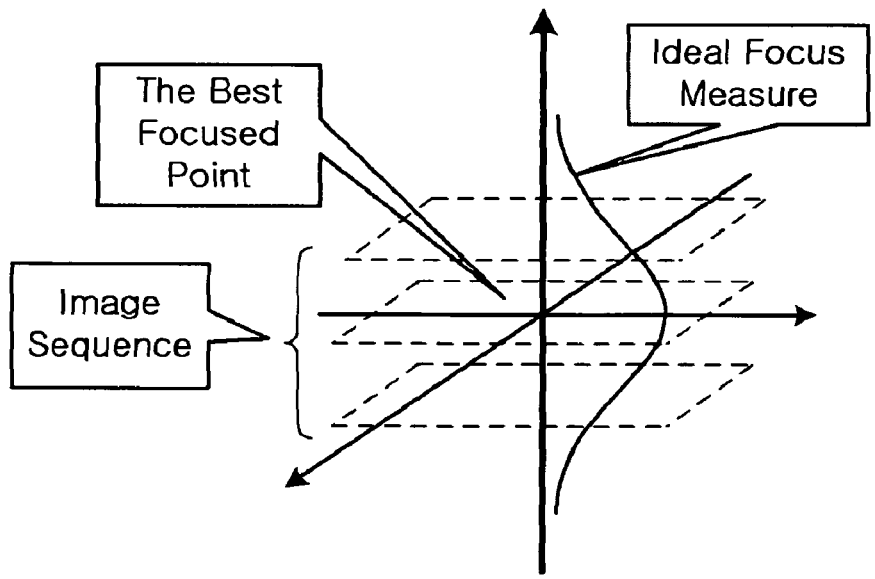

[Fig. 3]
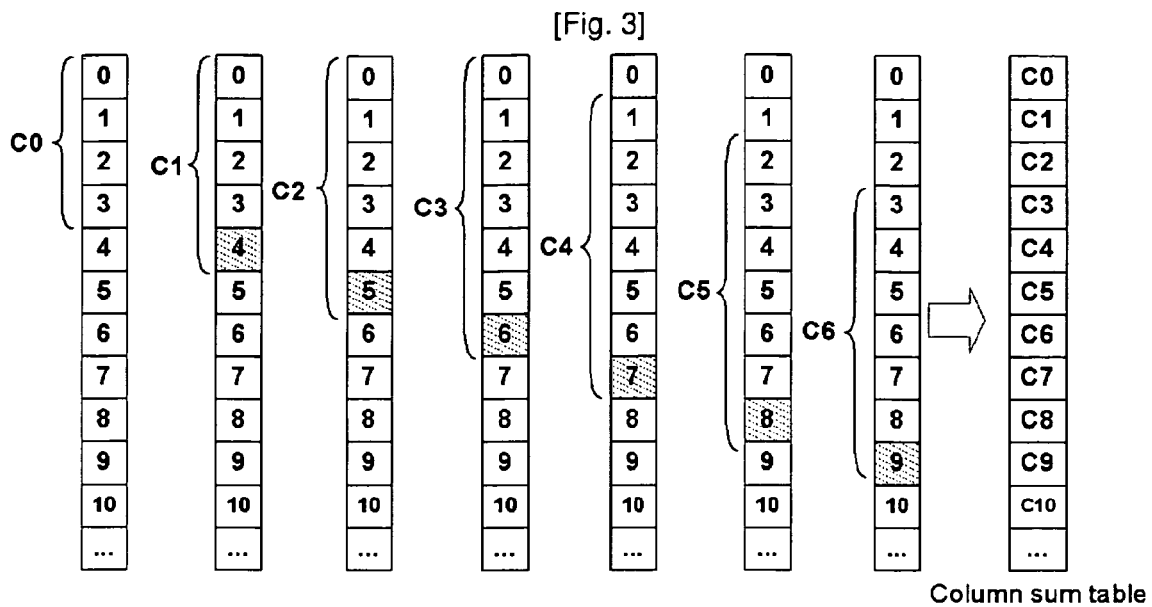
Column sum table
$C0 = \boxed{0} + \boxed{1} + \boxed{2} + \boxed{3}$  $C1 = C0 + \boxed{4}$  $C2 = C1 + \boxed{5}$
$C3 = C2 + \boxed{6}$  $C3 = C3 + \boxed{7} - \boxed{0}$  $C5 = C4 + \boxed{8} - \boxed{1}$ ...
[Fig. 4]
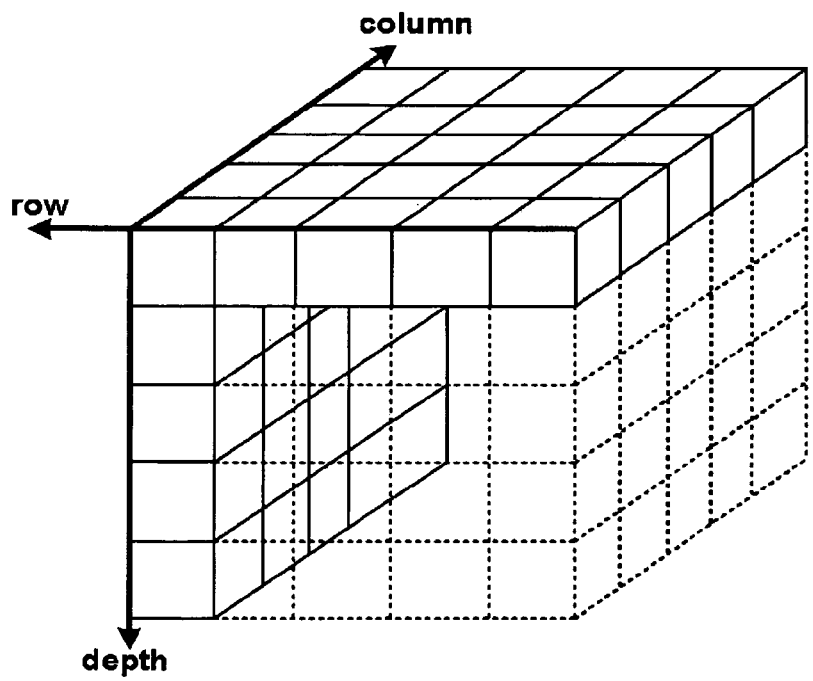

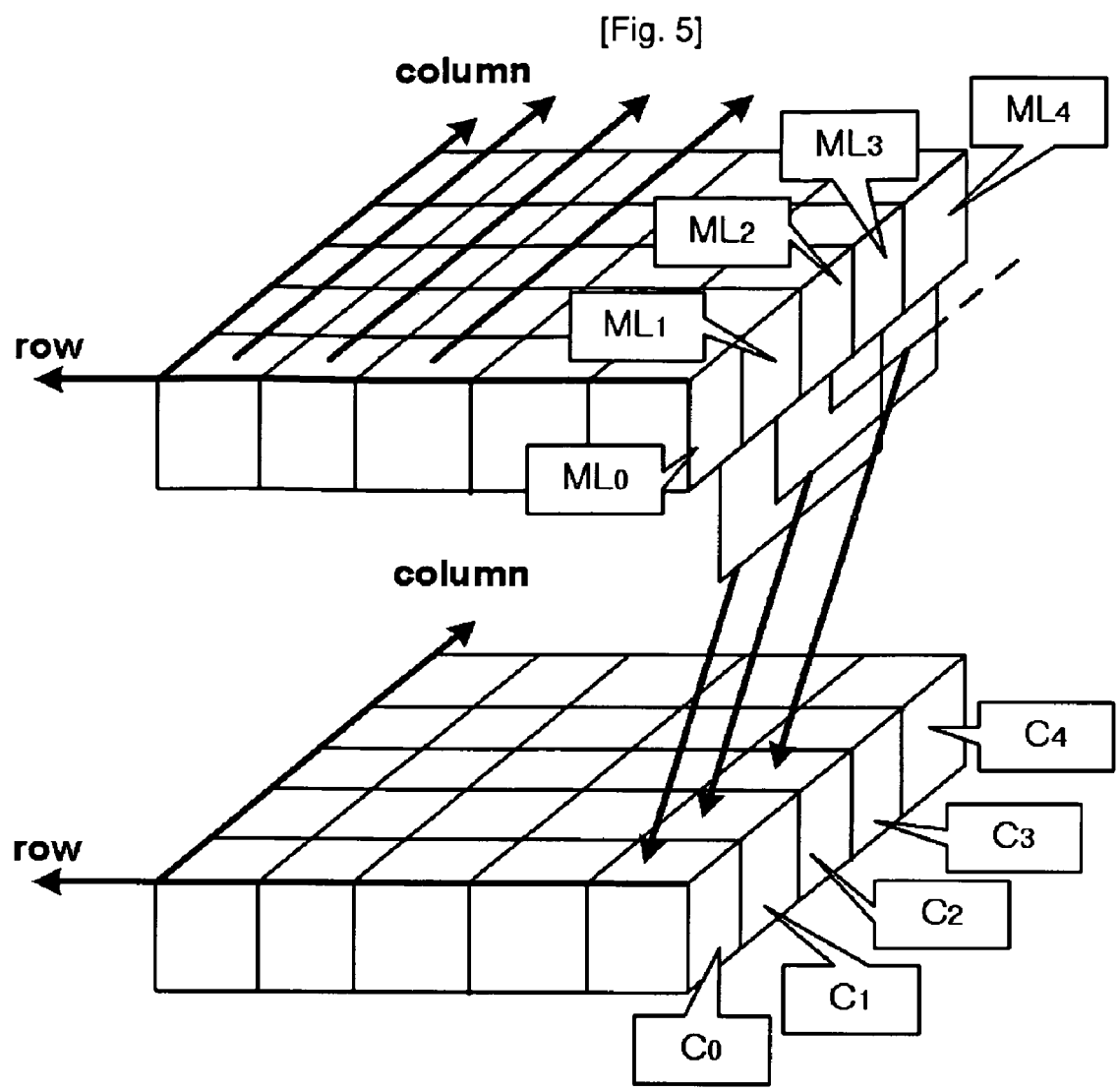
[Fig. 5]

[Fig. 6]
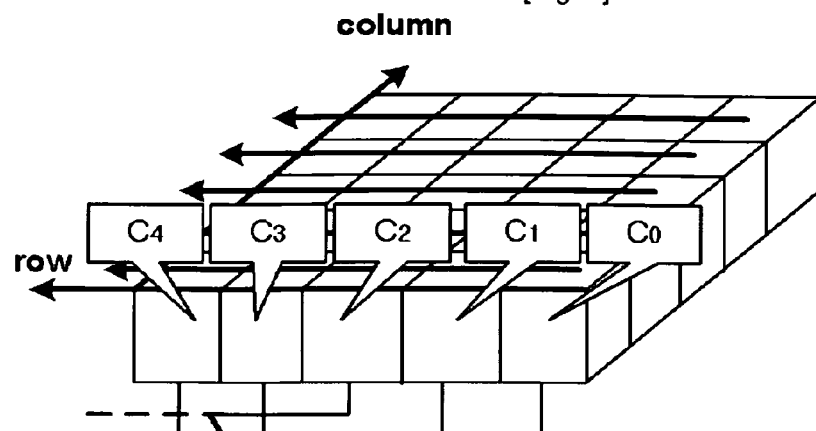
[Fig. 7]
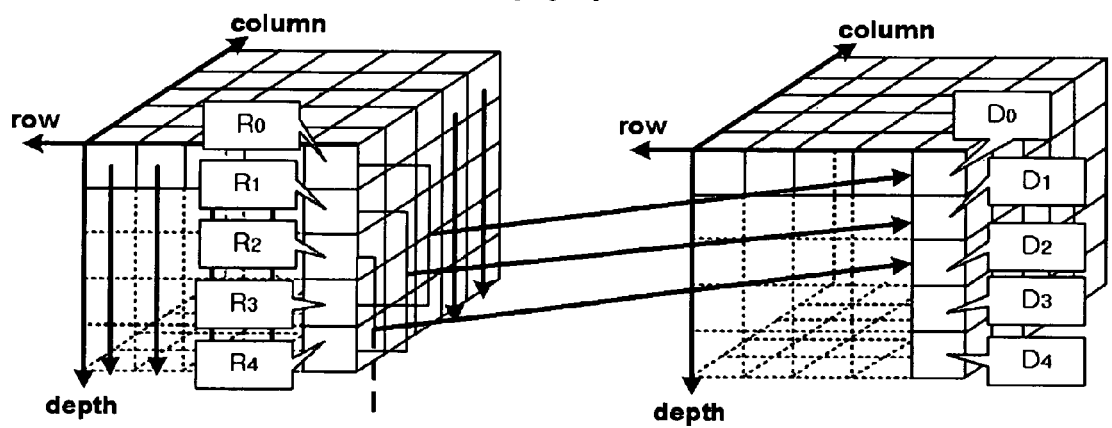

[Fig. 8]
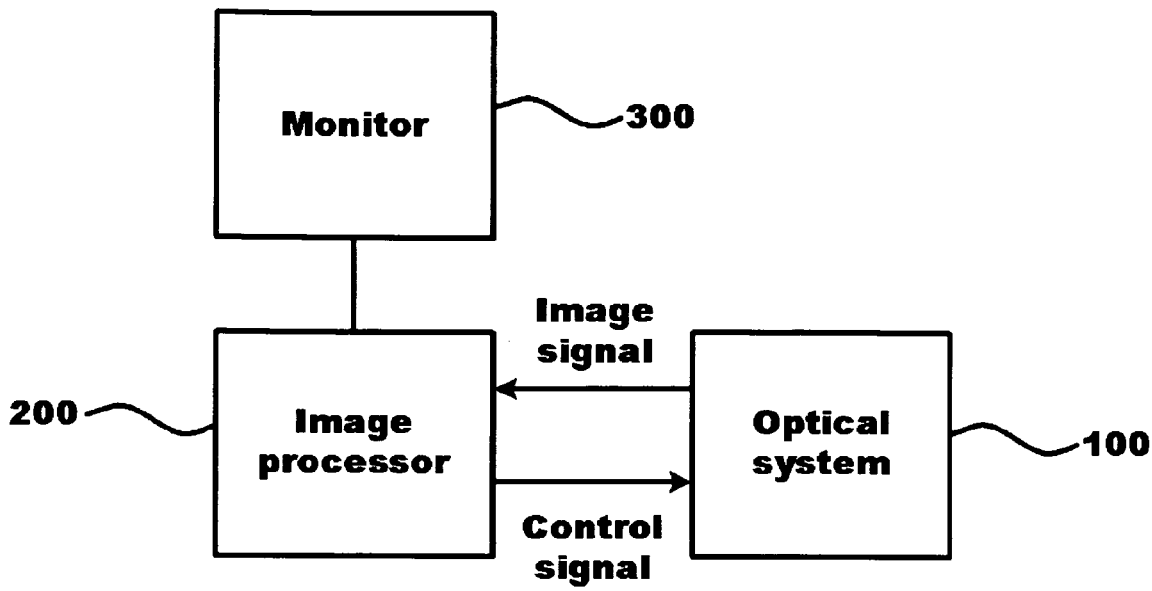
[Fig. 9]
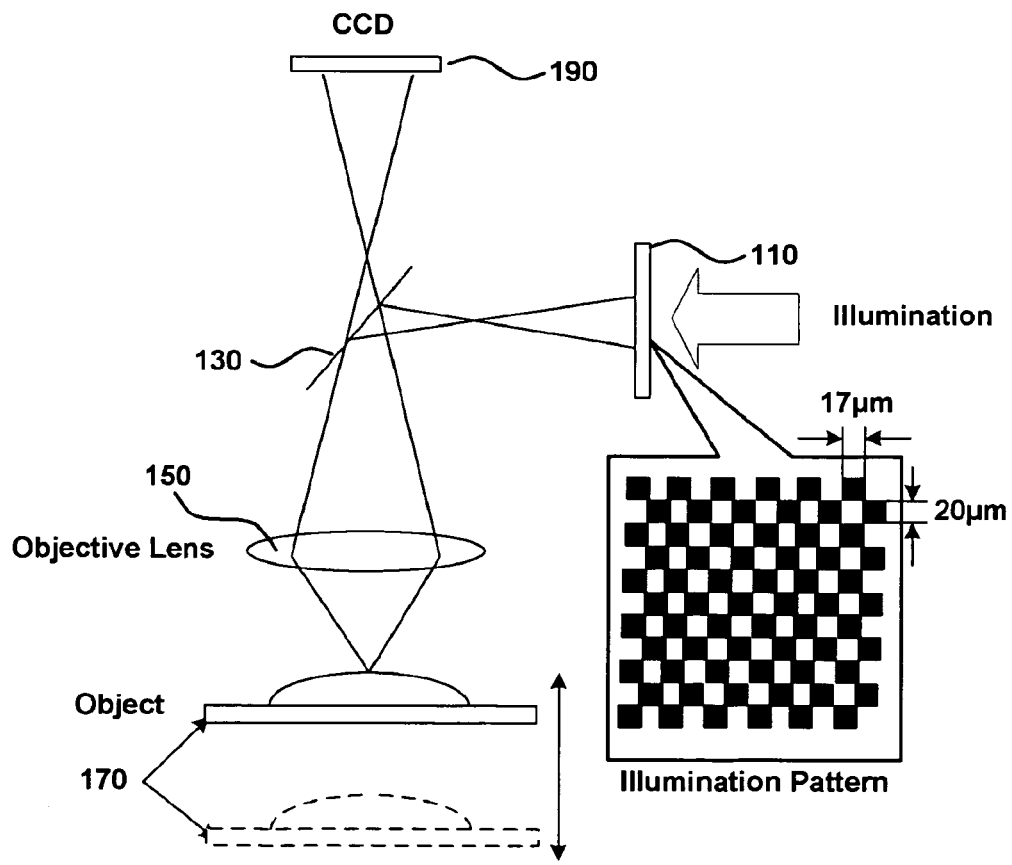

[Fig. 10]
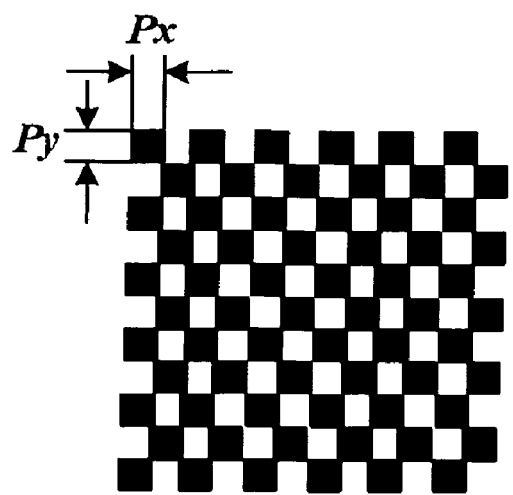 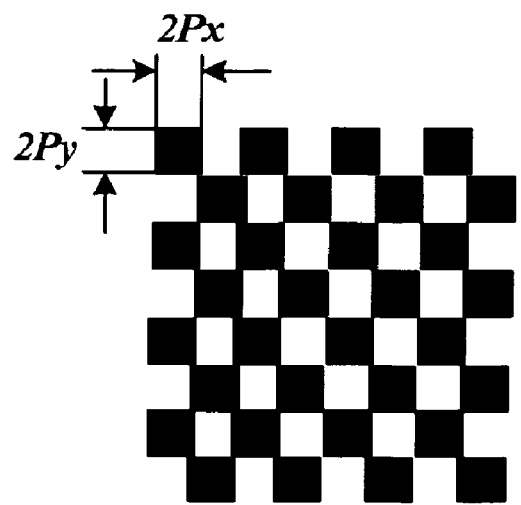
[Fig. 11]

[Fig. 12]
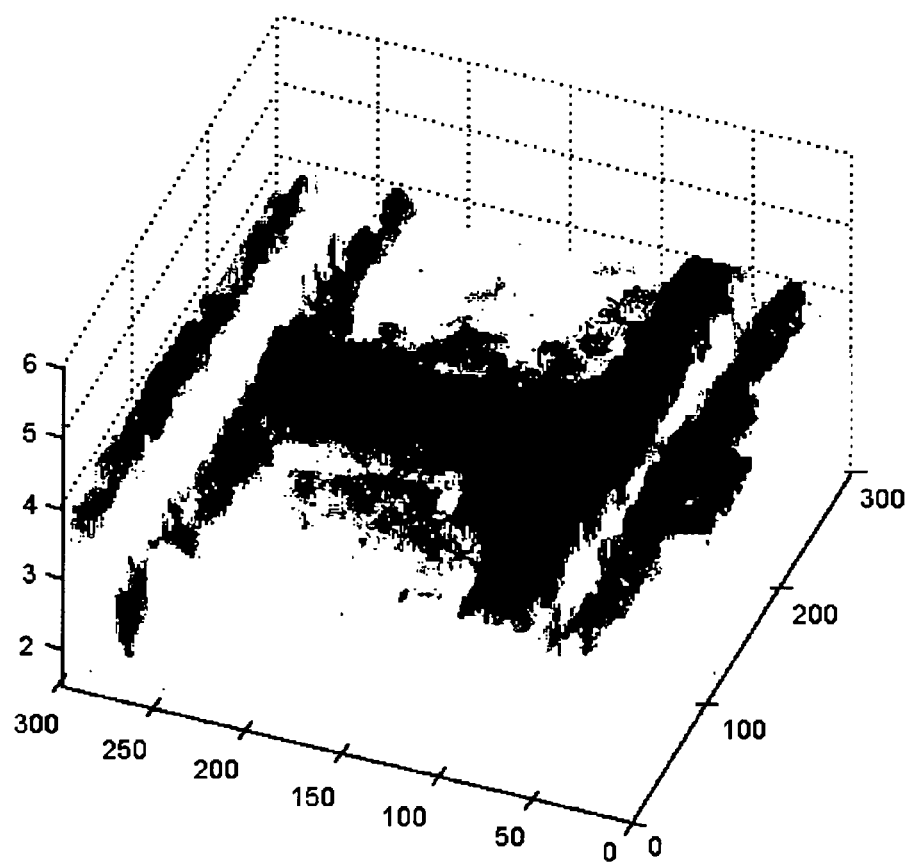
[Fig. 13]
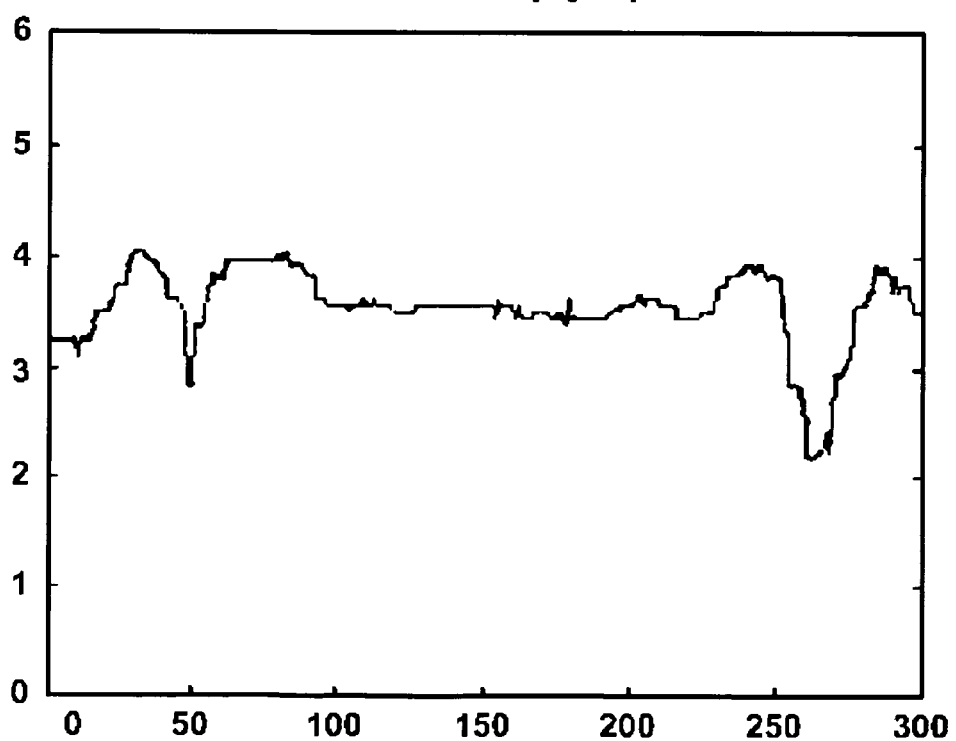

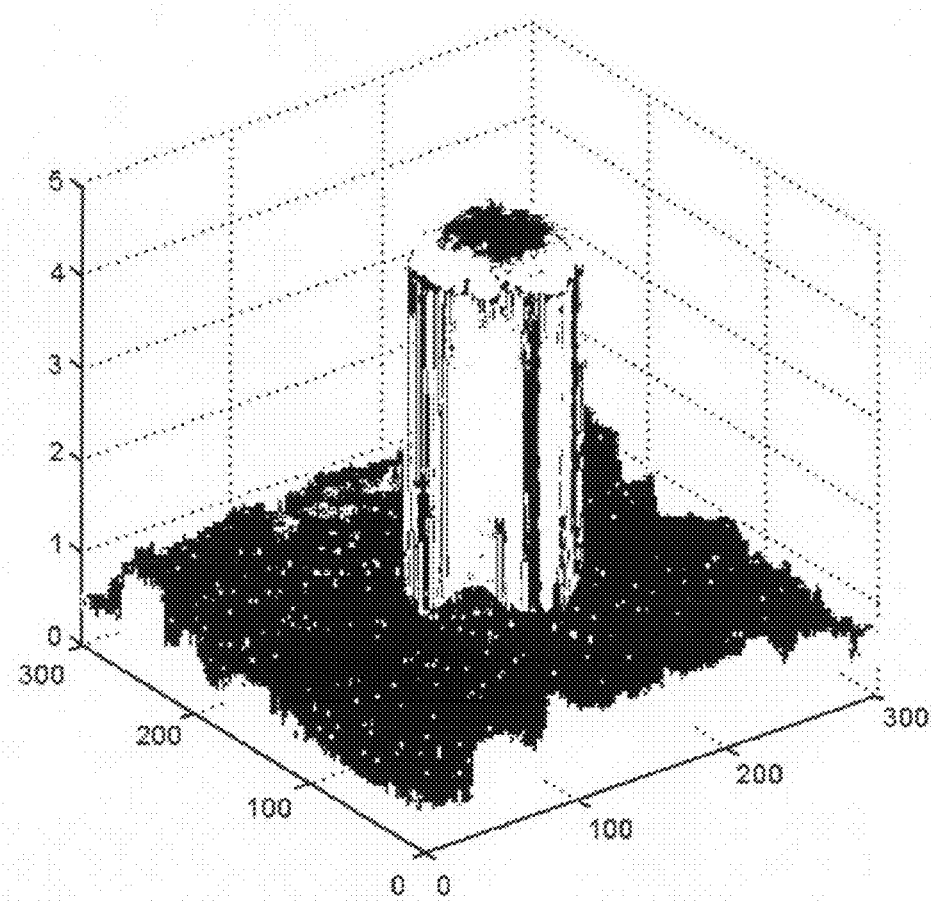
[Fig. 14]
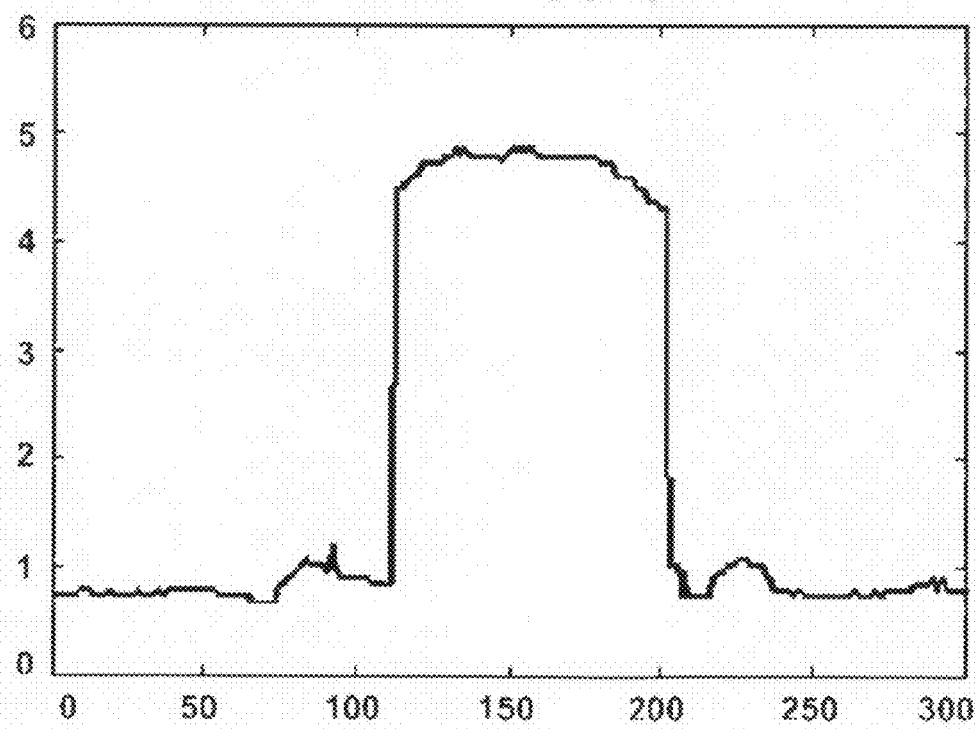
[Fig. 15]

US 7,796,246 B2

3-D SHAPE MEASURING METHOD FOR AUTO-GRINDING EQUIPMENT OF LCD COLOR FILTER AND 3-D SHAPE MEASURING APPARATUS FOR THE SAME

TECHNICAL FIELD

The present invention relates to a three-dimensional image measuring method and apparatus for a liquid crystal display (LCD) color filter automatic grinder, and more particularly, to a three-dimensional image measuring method and apparatus for an LCD color filter automatic grinder capable of measuring a three-dimensional image of an LCD color filter, even though textures for recovering the three-dimensional image are insufficient, by irradiating illumination passed through a patterned filter to the LCD color filter.

BACKGROUND ART

Generally, an LCD substrate is formed of two glass substrates. One substrate is a substrate on which a color filter is formed, and the other substrate is a substrate on which a thin film transistor (TFT) array is formed. The LCD color filter includes three primary colors, i.e., red, green and blue, and represents a color using a combination thereof.

A flatness of the glass substrate is a very important factor in the LCD color filter. Accordingly, a grinding process is performed after a process of forming an LCD color filter. In order to grind the LCD color filter, a process of measuring a three-dimensional image of the LCD color filter is performed. Generally, the measuring process is performed using a confocal microscope in a non-contact manner.

The confocal microscope has a small diameter pinhole between a light source and a light receiving device. In addition, light emitted from a point light source is concentrated to a point corresponding to a focus of an object surface by an object lens of a microscope, and the light reflected from the concentrated part is partially reflected by the object lens, passes through the pinhole, and then imaged on the light receiving device. At this time, when a position of the measurement surface is deviated from the focus, most light is blocked by the pinhole formed at a front end of the light receiving device, and only when the position of the measurement surface corresponds to the focus, most light can pass through the pin hole.

Since the confocal microscope employs a point-to-point imaging method, it is possible to obtain a clearer image than a general microscope and three-dimensional image information by appropriately scanning a position of the focus along the surface of the measurement object in a depth direction.

However, the confocal microscope is usually too expensive to use for measuring a three-dimensional image.

DISCLOSURE OF INVENTION

Technical Problem

The present invention is directed to a three-dimensional image measuring method for an LCD color filter automatic grinder capable of measuring a three-dimensional image of the LCD color filter by obtaining a plurality of image sequences from a shape of the LCD color filter through a camera.

The present invention is also directed to a three-dimensional image measuring apparatus for an LCD color filter automatic grinder capable of measuring a three-dimensional image of an LCD color filter, even though textures for recovering the three-dimensional image are insufficient, by irradiating illumination passed through a patterned filter to the LCD color filter.

Technical Solution

One aspect of the present invention provides a three-dimensional image measurement method for a liquid crystal display (LCD) color filter automatic grinder for measuring a three-dimensional image of a surface of an LCD color filter, the method including: obtaining a plurality of image sequences along an optical axis of a charge coupled device (CCD) camera; and measuring a three-dimensional focus measure of the obtained image sequences to measure a three-dimensional image of the LCD color filter.

Another aspect of the present invention provides a three-dimensional image measurement apparatus for a liquid crystal display (LCD) color filter automatic grinder for measuring a three-dimensional image of an LCD color filter using a method of obtaining a plurality of image sequences along an optical axis of a camera, characterized in that illumination irradiated to the LCD color filter to be measured passes through a patterned filter.

BRIEF DESCRIPTION OF THE DRAWINGS

FIG. 1 is a schematic view showing a process of forming an image of a three-dimensional object using a shape from focus (SFF) method;

FIG. 2 is a conceptual view showing an ideal focus measurement of a three-dimensional image measuring method for an LCD color filter automatic grinder in accordance with an exemplary embodiment of the present invention;

FIG. 3 is a conceptual view showing a process of calculating a column sum table;

FIGS. 4 to 7 are conceptual views showing processes of continuously performing a focus measurement and renewal algorithm of a three-dimensional focus measurement operator;

FIG. 4 illustrates the Modified Laplacian (ML) volume;

FIG. 5 graphically illustrates a first step of calculating a column sum table;

FIG. 6 graphically illustrates a second step of calculating a row sum table;

FIG. 7 graphically illustrates a third step of calculating a depth sum table;

FIG. 8 is a block diagram of an apparatus used in a three-dimensional image measuring method for an LCD color filter automatic grinder in accordance with an exemplary embodiment of the present invention;

FIG. 9 is a schematic view of an optical system including an active illumination adapting a filter used in a three-dimensional image measuring method for an LCD color filter automatic grinder in accordance with an exemplary embodiment of the present invention;

FIG. 10 is a conceptual plan view of a filter of a three-dimensional image measuring apparatus for an LCD color filter automatic grinder in accordance with an exemplary embodiment of the present invention;

FIG. 11 is a photograph of an image of an LCD color filter;

FIG. 12 is a graphical view showing a normal LCD color filter three-dimensionally recovered by a three-dimensional image measuring method for an LCD color filter automatic grinder in accordance with an exemplary embodiment of the present invention;

FIG. 13 is a cross-sectional view of a center part of FIG. 12;

FIG. 14 is a graphical view showing a projection of an LCD color filter to be three-dimensionally recovered by a three-dimensional image measuring method for an LCD color filter automatic grinder in accordance with an exemplary embodiment of the present invention; and FIG. 15 is a cross-sectional view of a center part of FIG. 14.

MODE FOR THE INVENTION

Hereinafter, a three-dimensional image measuring method and apparatus for an LCD color filter automatic grinder in accordance with the present invention will be described in detail with reference to the accompanying drawings.

The present invention provides a three-dimensional image measuring method and apparatus for an LCD color filter automatic grinder using a shape from focus (SFF) method as technology of measuring a three-dimensional image of an LCD color filter in a non-contact manner using an optical system including a CCD camera or a CMOS image sensor (CIS) camera.

The SFF method includes calculating a focus measure of a plane perpendicular to an optical axis, and finding a position of a maximum focus measure to measure a three-dimensional image or distance of an object.

FIG. 1 is a schematic view of showing a process of forming an image of a three-dimensional object using a shape from focus (SFF) method.

In FIG. 1, when an image detector is positioned at a distance v from a lens, an image of a point on the object having the largest focus measure is formed at a point of the image detector. Therefore, using the following lens formula, a distance u between the lens and the object can be obtained from the relationship between f (a focal distance of the lens) and v (a distance from the lens to a focused image).

$$\frac{1}{f} = \frac{1}{u} + \frac{1}{v} \qquad \text{[Formula 1]}$$

Since a plane image detector such as a CCD array or a CIS array is used as a sensor for photographing an image, an irregular object has partially focused images and other blurred images. Therefore, a number of image sequences are obtained along an optical axis of a camera to measure a three-dimensional image.

Generally, in order to measure a three-dimensional image using an optical system including a CCD camera or a CIS camera in a non-contact manner, an object to be measured should have sufficient textures. However, the LCD color filter has little texture required for recovering a three-dimensional image.

When the image obtained by the camera during the measurement of the three-dimensional image using the optical system including a CCD camera or a CIS camera in a non-contact manner is not focused, the image may be blurred. Therefore, a focus measurement operator should respond to variation of a high frequency with respect to a pixel value of an image, and the operator should have a maximum value when the image is ideally and perfectly focused.

One of methods of high-frequency filtering an image includes calculating a second-order differential of the image using Laplacian. The second-order differential using Laplacian makes the second-order differential values in x and y directions have different signs to offset the values. In order to solve the problem, the following Modified Laplacian is mainly used for a frame.

$$\nabla_{ML}^2 I(x, y, z_0) = \left|\frac{\partial^2 I}{\partial x^2}\right| + \left|\frac{\partial^2 I}{\partial y^2}\right| \qquad \text{[Formula 2]}$$

wherein I in Formula 2 represents intensity of an image.

The focus measurement calculates the Modified Laplacian with respect to a small window in an x-y plane, and the calculated result is defined as the focus measurement.

Meanwhile, a focus of a z-axis in an image sequence as well as the focus measure of a two-dimensional x-y plane may play an important role in an actual image sequence. Therefore, in order to more precisely recover the three-dimensional image, it is possible to recover a three-dimensional image of a small cubic body around a point (x, y, z) using a three-dimensional focus measurement operator according to the following Formula 3

$$F(x, y, z) = \sum_{i=x-N}^{x+N} \sum_{i=y-N}^{y+N} \sum_{i=z-N}^{z+N} \nabla_{ML}^2 I(i, j, k) \qquad \text{[Formula 3]}$$

wherein x=0, 1, . . . , W
y=0, 1, . . . , H
z=0, 1, . . . , K.

In Formula 3, W represents the width of an image, H represents the height of an image, and K represents the number of images (frames), which correspond to the number of rows, columns, and depths, respectively. In addition, N represents the size of a window, and F (x, y, z) represents a focus measurement operator, which shows cleanness of each of the image frames in a numerical manner.

In Formula 3, considering a z-axis, it is possible to more precisely calculate the focus measurement between the frames. When the above three-dimensional focus measurement operator is used, the focus measurement calculation of one pixel has Gaussian-like distribution. The best focused point has a maximum value, i.e., an ideal focus measure, and the focus measure decreases the further from the best focused point that it becomes. Therefore, the three-dimensional focus measurement operator in consideration of the focus measure of the z-axis can provide a more precise focus measure.

If the z-axis is not considered in Formula 3, a factor K of the z-axis is 0, and, in this case, the obtained image is an image of the x-y plane.

FIG. 2 is a conceptual view showing an ideal focus measurement of a three-dimensional image measuring method for an LCD color filter automatic grinder in accordance with an exemplary embodiment of the present invention.

Referring to FIG. 2, the focus measurement calculation of one pixel has Gaussian-like distribution. The best focused point has a maximum value, i.e., an ideal focus measure, and the focus measure decreases the further from the best focused point it becomes. Therefore, the three-dimensional focus measurement operator in consideration of the focus measure of the z-axis can provide a more precise focus measure.

Meanwhile, use of the three-dimensional focus measurement operator in consideration of the z-axis increases a calculation amount. Calculation for recovering the three-dimensional image using Formula 3 may be simplified through the following method.

The calculation can be simplified by applying a continuous focus measurement renewal algorithm. That is, the continuous focus measurement renewal can be simplified as the calculation of a function given in Formula 3 continuously renews the focus measurement with respect to each dimension.

A simple example shown in FIG. 3 of the continuous focus measurement renewal algorithm is a process of performing a continuous focus measurement renewal algorithm in the case of a window size N=3. FIG. 3 is a conceptual view showing a process of calculating a column sum table. In edges of the image, only a region included in the window is considered.

Briefly described, calculations of a row sum table corresponding to the width of an image, a column sum table corresponding to the height of an image, and a depth sum table corresponding to the number of images are sequentially performed.

The row sum table, the column sum table, and the depth sum table are represented as Ti defined by $$T_i = \sum_{k=i-N}^{i+N} S_k \ (i = 0, 1, \ldots L)$$

and the Ti is obtained from the calculation of Formula 3.

A continuous focus measurement renewal algorithm of each sum table defined as Ti in a window having a size N is as follows:

If $i = 0$
$$T_i = \sum_{k=0}^{N} S_k$$
or if $0 < i \leq N$
$T_i = T_{i-1} + S_{i+N}$
or if $N < i < L-N$
$T_i = T_{i-1} + S_{i+N} - S_{i-N}$
or if $L - N = i$
$T_i = T_{i-1} - S_{i-N}$
end
wherein $L = W$, H or K.

The continuous focus measurement renewal algorithm of the three-dimensional focus measurement operator is performed through three steps. The first step calculates a column sum table, the second step calculates a row sum table, and the third step calculates a depth sum table, thereby completely calculating the three-dimensional focus measurement. However, calculation sequence of the sum tables may vary. That is, the row sum table may be firstly calculated, or the depth sum table may be firstly calculated, instead of the column sum table.

FIGS. 4 to 7 are conceptual views showing processes of continuously performing a focus measurement and renewal algorithm of a three-dimensional focus measurement operator.

FIG. 4 illustrates the Modified Laplacian (LM) volume.

FIG. 5 graphically illustrates a first step of calculating a column sum table.

FIG. 6 graphically illustrates a second step of calculating a row sum table.

FIG. 7 graphically illustrates a third step of calculating a depth sum table.

In order to perform the first step, i.e., calculation of the column sum table, $$ML_i = \nabla_{ML}^2 I(x_c, i, Z_c)$$

In this process, $x_c$ and $z_c$ are constant. The respective columns $C_0, C_1, \ldots, C_{H-1}$ of the frame are calculated using the following algorithm. Such a process is schematically shown in FIG. 3.

If $i = 0$
$$C_i = \sum_{k=0}^{N} ML_k$$
or if $0 < i \leq N$
$C_i = C_{i-1} + ML_{i+N}$
or if $N < i < H-N$
$C_i = C_{i-1} + ML_{i+N} - ML_{i-N}$
or if $H-N = i$
$C_i = C_{i-1} - ML_{i-N}$
end It will be appreciated that the above process can readily calculate a column sum by continuously renewing the previously calculated value when the column sum in the window is calculated.

After the column sum table is calculated, the row sum table is calculated. The row sum table can be calculated using the following continuous focus measurement renewal algorithm by applying the same process to each row of the column sum table.

If $i = 0$
$$R_i = \sum_{k=0}^{N} C_k$$
or if $0 < i \leq N$
$R_i = R_{i-1} + C_{i+N}$
or if $N < i < W-N$
$R_i = R_{i-1} + C_{i+N} - C_{i-N}$
or if $W-N \leq i$
$R_i = R_{i-1} - C_{i-N}$
end The final focus measurement of Formula 2 can be calculated through the following algorithm by applying the same process to the respective columns of the row sum table stack.

If $i = 0$
$$D_i = \sum_{k=0}^{N} R_k$$
or if $0 < i \leq N$
$D_i = D_{i-1} + R_{i+N}$
or if $N < i < K - N$
$D_i = D_{i-1} + R_{i+N} - R_{i-N}$
or if $K - N \leq i$
$D_i = D_{i-1} - R_{i-N}$
end The measurement speed can be remarkably improved using the continuous focus measurement renewal algorithm in comparison with the direct implementation of Formula 3.

Hereinafter, a three-dimensional image measuring apparatus for an LCD color filter automatic grinder for measuring a three-dimensional image of an LCD color filter using a three-dimensional image measuring method for an LCD color filter automatic grinder will be described in detail.

FIG. 8 is a block diagram of an apparatus used in a three-dimensional image measuring method for an LCD color filter automatic grinder in accordance with an exemplary embodiment of the present invention.

Referring to FIG. 8, the three-dimensional image measuring apparatus for an LCD color filter automatic grinder includes: an optical system 100 for enlarging and photographing an image of a color filter, and irradiating patterned illumination to the color filter; an image processor 200 for recovering a three-dimensional image from the image photographed from the optical system 100; and a monitor 300 for displaying the processed image. An image signal obtained by the optical system 100 is input into the image processor 200, and the image processor 200 implements the obtained image signal as a three-dimensional image, thereby displaying the three-dimensional image through the monitor 300. In addition, the image processor 200 generates a control signal for adjusting vertical movement of a stage of the optical system 100.

Further, the optical system 100 includes: a microscope for enlarging an image of a color filter; a camera for photographing the image enlarged by the microscope; a motor for moving the stage of the microscope on which the color filter is disposed; a motor driver for controlling the motor; and an active illumination for irradiating patterned illumination using a patterned filter to the color filter.

In addition, the image processor 200 includes a frame grab for receiving an image from the camera of the optical system 100, and recovers a three-dimensional image from the photographed image. The process of recovering the three-dimensional image from the photographed image using the image processor employs the three-dimensional focus measurement operator of Formula 3.

Further, in the case of using the three-dimensional focus measurement operator in consideration of the z-axis of Formula 3, the calculation amount may be increased. In this case, in order to simplify the calculation, the continuous focus measurement renewal algorithm may be used.

The LCD color filter generally has little texture required for recovering a three-dimensional image. In order to solve the problem, illumination is irradiated to an LCD color filter to be measured through a patterned filter.

FIG. 9 is a schematic view of an optical system including an active illumination adapting a filter used in a three-dimensional image measuring method for an LCD color filter automatic grinder in accordance with an exemplary embodiment of the present invention.

Referring to FIG. 9, an active illumination includes an illumination filter 110 in which a pattern is arranged in front of an illumination. Light passed through the illumination filter 110 enters an objective lens 150 through a translucent mirror 130, and then passes through the objective lens 150 to be irradiated to a surface of a color filter to be photographed. A stage 170 is vertically moved to find an optimal focus. In addition, the light reflected from the color filter passes through the objective lens 150 and the translucent mirror 130 to enter a camera 190. In FIG. 9, the camera 190 is a CCD camera. However, it will be appreciated that various cameras may be employed for the purpose of photographing an image.

FIG. 10 is a conceptual plan view of a filter of a three-dimensional image measuring apparatus for an LCD color filter automatic grinder in accordance with an exemplary embodiment of the present invention.

Referring to FIGS. 9 and 10, the illumination filter may have a lattice pattern having each pixel of Px×Py (or 2Px×2Py). The patterned filter is disposed in front of the illumination.

The pattern of the illumination filter has pixels of 17☐×20☐ in a lattice array. The patterned filter is disposed in front of the illumination.

A test was performed in which illumination was irradiated to an LCD color filter through the patterned filter, and the image was photographed to recover a three-dimensional image. In the test, the microscope used an OPHIPHOT 100S microscope available from Nikon Inc., the camera used an XC-75 CCD camera available from Sony Inc., the motor drive used a step motor driver MAC5000, and the image processor used a Matrox Meteor-II frame grabber and a Pentium PC. In addition, in the test, the illumination filter used an illumination filter having a lattice pattern with a pixel of 17☐×20☐.

FIG. 11 is a photograph of an image of an LCD color filter.

FIG. 12 is a graphical view showing a normal LCD color filter three-dimensionally recovered by a three-dimensional image measuring method for an LCD color filter automatic grinder in accordance with an exemplary embodiment of the present invention.

FIG. 13 is a cross-sectional view of a center part of FIG. 12.

FIG. 14 is a graphical view showing a projection of an LCD color filter to be three-dimensionally recovered by a three-dimensional image measuring method for an LCD color filter automatic grinder in accordance with an exemplary embodiment of the present invention.

FIG. 15 is a cross-sectional view of a center part of FIG. 14.

Referring to the drawings, it will be appreciated that the three-dimensional image of the LCD color filter measured by the method in accordance with the present invention has sufficient precision to automatically grind the LCD color filter. In addition, it is possible to obtain a sufficient measurement speed by applying the continuous focus measurement renewal algorithm.

INDUSTRIAL APPLICABILITY

As can be seen from the foregoing, a three-dimensional image measuring method and apparatus for an LCD color filter automatic grinder in accordance with the present invention can measure a three-dimensional image of an LCD color filter, even though textures for recovering the three-dimensional image are insufficient, by irradiating illumination passed through a patterned filter to the LCD color filter.

While the three-dimensional image measuring method and apparatus for an LCD color filter automatic grinder in accordance with the present invention have been shown and described with reference to certain exemplary embodiments thereof, it will be understood by those skilled in the art that various changes in form and details may be made therein without departing from the spirit and scope of the invention as defined by the appended claims.

The invention claimed is:

1. A three-dimensional image measurement method for a liquid crystal display (LCD) color filter automatic grinder for measuring a three-dimensional image of a surface of an LCD color filter, the method comprising:

obtaining a plurality of image sequences along an optical axis of a charge coupled device (CCD) camera; and measuring a three-dimensional focus measure of the obtained image sequences to measure a three-dimensional image of the LCD color filter;

wherein the three-dimensional image of the color filter is recovered by measuring a three-dimensional focus measure in a fine cubic body around a point (x, y, z) according to the following formula:

$$F(x, y, z) = \sum_{i=x-N}^{x+N} \sum_{i=y-N}^{y+N} \sum_{i=z-N}^{z+N} \nabla_{ML}^2 I(i, j, k)$$

wherein x=0, 1, ..., W (an image width)
y=0, 1, ..., H (an image height)
z=0, 1, ..., K (the number of images in an image sequence)
N: a window size
I: intensity of an image
F: a focus measurement operator.

2. The three-dimensional image measurement method according to claim 1, wherein, when the factor K of the z-axis is 0, the image of the color filter represents a plane image.

3. The three-dimensional image measurement method according to claim 1, wherein calculations for the three-dimensional focus measurement formed of a row sum table corresponding to the image width, a column sum table corresponding to the image height, and a depth sum table corresponding to the number of images are performed using a continuous focus measurement renewal algorithm of each sum table Ti defined by $$T_i = \sum_{k=i-N}^{i+N} S_k (i = 0, 1, \ldots L)$$

and the continuous focus measurement renewal algorithm is as follows:

```
If i = 0
    T_i = ∑_{k=0}^{N} S_k
or if 0 < i ≤ N
    T_i = T_{i-1} + S_{i+N}
or if N < i < L-N
    T_i = T_{i-1} + S_{i+N} - S_{i-N}
or if L - N ≤ i
    T_i = T_{i-1} - S_{i-N}
end
wherein L = W, H or K.
```

4. A three-dimensional image measurement apparatus for a liquid crystal display CLCD) color filter automatic grinder for measuring a three-dimensional image of an LCD color filter using a method of obtaining a plurality of image sequences along an optical axis of a camera, characterized in that illumination irradiated to the LCD color filter to be measured passes through a patterned filter;
wherein the image processor comprises a frame grab for receiving an image from the camera of the optical system, and recovers a three-dimensional image from the photographed image, and
the three-dimensional image of the color filter is measured and recovered by measuring a three-dimensional focus measure in a fine cubic body around a point (x, y, z) according to the following formula:

$$F(x, y, z) = \sum_{i=x-N}^{x+N} \sum_{i=y-N}^{y+N} \sum_{i=z-N}^{z+N} \nabla_{ML}^2 I(i, j, k)$$

wherein x=0, 1, ..., W (an image width)
y=0, 1, ..., H (an image height)
z=0, 1, ..., K (the number of images in an image sequence)
N: a window size
I: intensity of an image
F: a focus measurement operator.

5. The three-dimensional image measurement apparatus according to claim 4, wherein the three-dimensional image measurement apparatus comprises:
an optical system for enlarging and photographing the image of the color filter, and irradiating patterned illumination to the color filter; and
an image processor for recovering a three-dimensional image from the image photographed from the optical system.

6. The three-dimensional image measurement apparatus according to claim 4,
wherein the optical system comprises:
a microscope for enlarging the image of the color filter;
a camera for photographing the image enlarged by the microscope;
a motor for moving a stage of the microscope on which the color filter is disposed;
a motor driver for controlling the motor; and
an active illumination for irradiating illumination patterned using a patterned filter to the color filter.

* * * * *